Figure 6:
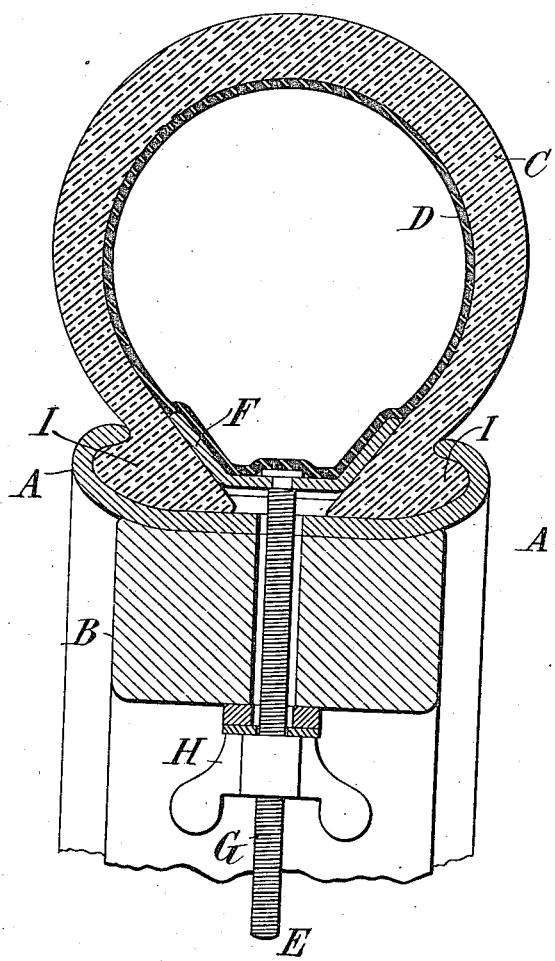

M. C. SCHWEINERT & H. P. KRAFT.
CLAMP FOR PNEUMATIC TIRES.
APPLICATION FILED MAR. 14, 1910.
1,163,695.
Patented Dec. 14, 1915.
3 SHEETS—SHEET 1.
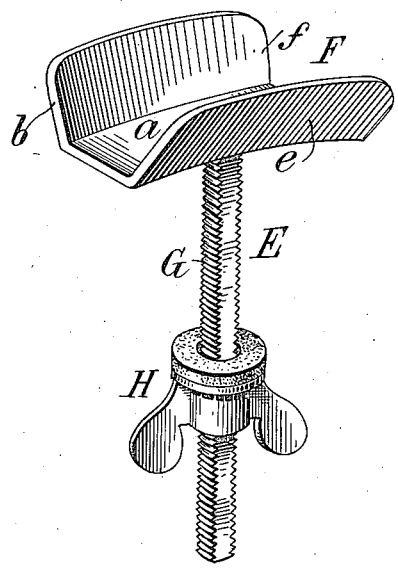
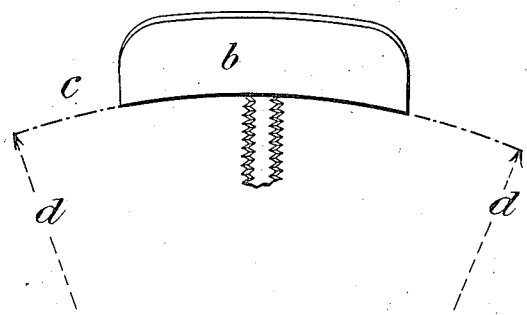
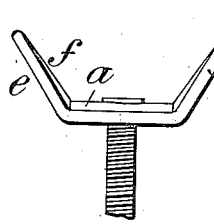
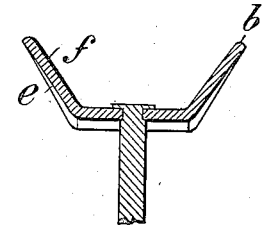
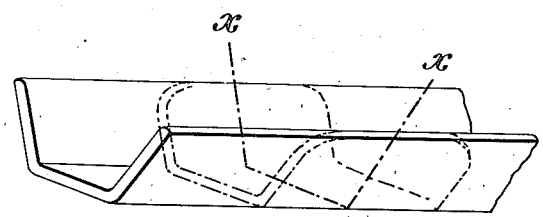
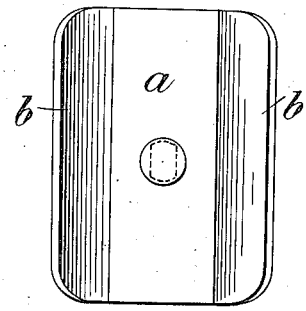
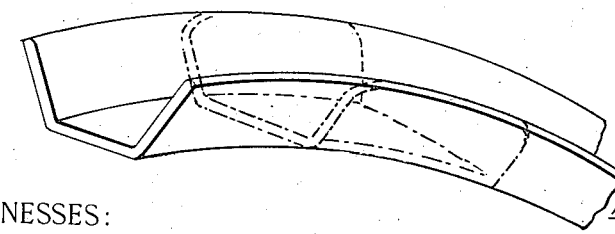
WITNESSES:
Fred White
René Bruine
INVENTORS:
Maximilian Charles Schweinert,
and Henry P. Kraft,
By Attorneys, M. C. SCHWEINERT & H. P. KRAFT.
CLAMP FOR PNEUMATIC TIRES.
APPLICATION FILED MAR. 14, 1910.

1,163,695.

Patented Dec. 14, 1915.
3 SHEETS—SHEET 2.

WITNESSES:

INVENTORS:
Maximilian Charles Schweinert
and Henry P. Kraft,
By Attorneys,

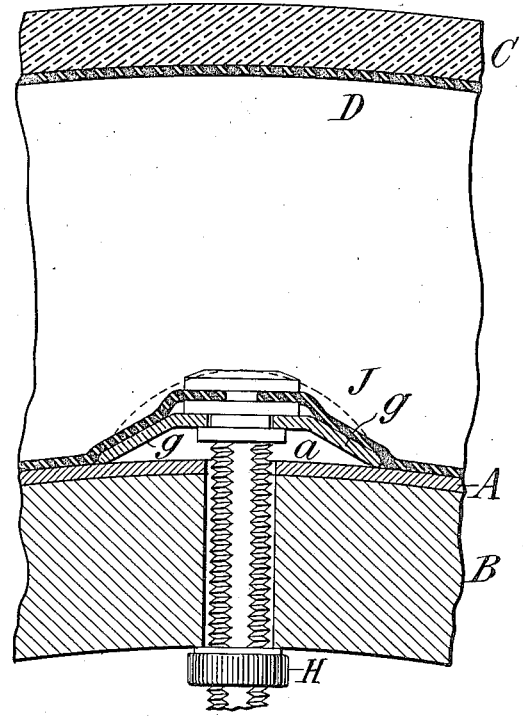
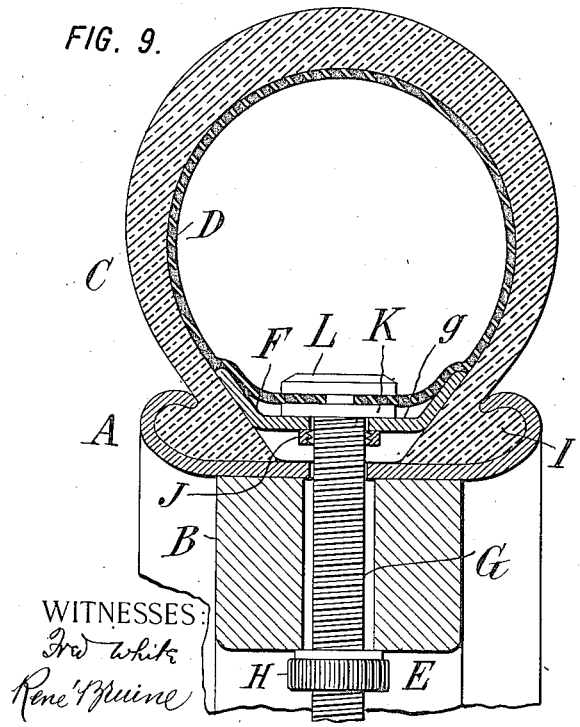
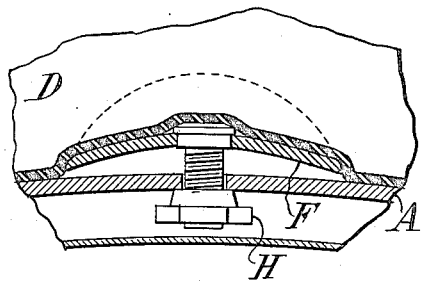
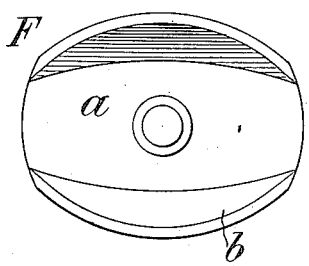
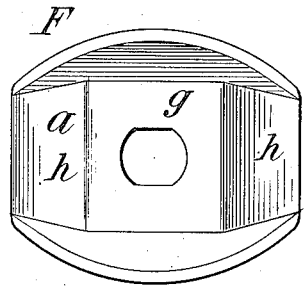

UNITED STATES PATENT OFFICE.

MAXIMILIAN CHARLES SCHWEINERT, OF WEST HOBOKEN, NEW JERSEY, AND HENRY P. KRAFT, OF NEW YORK, N. Y.

CLAMP FOR PNEUMATIC TIRES.

1,163,695.

Specification of Letters Patent.

Patented Dec. 14, 1915.

Application filed March 14, 1910. Serial No. 549,241.

*To all whom it may concern:*

Be it known that we, MAXIMILIAN CHARLES SCHWEINERT, residing in West Hoboken, in the county of Hudson and State of New Jersey, and HENRY P. KRAFT, residing in the borough of Brooklyn, county of Kings, city and State of New York, citizens of the United States, have jointly invented certain new and useful Improvements in Clamps for Pneumatic Tires, of which the following is a specification.

This invention relates to clamps, commonly called stay bolts, which are used with pneumatic tires of the clencher type to hold the thickened marginal flanges of the outer shoe in engagement with the overhanging flanges of the wheel rim. Such stay bolts as heretofore constructed have comprised a screwthreaded stem and nut, the stem having a head which enters between the rim and inner tube, and which consists of a disk having its sides turned up at an angle conforming approximately to the sloping inner faces of the thickened flanges of the shoe, so that by tightening the nut the head is drawn toward the hub and its sloping sides press outwardly against the shoe flanges and force them out into close engagement with the rim flanges. Stay bolts thus constructed have proven satisfactory under ordinary conditions and where no excessive strains are involved, but for racing and other equally exacting conditions occurring in high speed travel along ordinary roads, and particularly in making sharp turns, it has been found that the tire shoe will occasionally escape from the restraint of the stay bolts and be dragged off the wheel rim with disastrous results.

Our invention aims to improve the construction of the stay bolts so as to increase their hold upon the shoe and avoid the possibility of the shoe being torn out from the stay bolts under even the most extreme and exacting conditions.

The ordinary stay bolt head is formed of a disk of metal plate bent into three planes, the middle portion being flat and occupying a plane tangential to the rim, and the side portions being equally flat and occupying inclined planes. It results from this construction that the head has its most intimate engagement with the shoe at and near a plane transverse to the tire and coinciding with the center of the screwthreaded stem, and that as the head recedes from such plane in both directions its contact with the shoe becomes progressively less intimate until at the advancing and following ends of the head it has the minimum contact with the shoe. According to our invention we construct the head with its middle zone and its inclined sides as curved surfaces so shaped that the engagement of the wings with the inclined surfaces of the shoe is at least as close toward the ends of the head as in the medial plane, and preferably is even closer toward the ends than in such plane. To this end the inclined wings are made externally concave, while the middle zone is also made concave on the side toward the hub of the wheel, its concavity being preferably in the arc of a circle of radius no greater and preferably somewhat smaller than that corresponding to the distance between the head and the axis or center of rotation of the wheel. Thus constructed the stay bolt head has a greatly improved and strengthened hold upon the shoe, the improvement being such that whereas stay bolts thus constructed have been in numerous instances substituted for those of the old construction in tires used on racing cars where they were subjected to the most extreme conditions, in no single instance has the shoe pulled away from the hold of the clamping devices or stay bolts, whereas under like conditions with the old style of stay bolt head, accidents due to the escape of the shoe from the stay bolts were perilously frequent.

Figure 7:
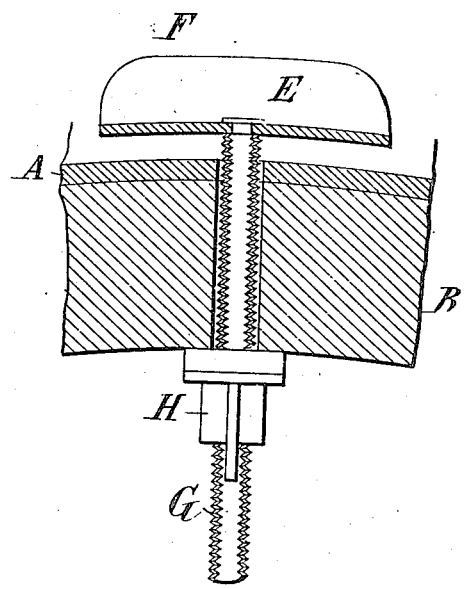

In the accompanying drawings, Figure 1 is a perspective view of one form of our improved clamp or stay bolt; Fig. 2 is a side elevation thereof; Fig. 3 is an end elevation thereof; Fig. 4 is a transverse midsection thereof; Fig. 5 is a plan of the head; Fig. 6 is a transverse section of a rim and tire fitted with our clamp; Fig. 7 is a fragmentary longitudinal section of the same; Fig. 8 is a longitudinal section of a modified form showing the clamp combined with the air valve; Fig. 9 is a transverse section of Fig. 8; Fig. 10 is a plan of the head of the modified clamp shown in Figs. 8 and 9; Figs. 11 and 12 are perspective diagrams; Fig. 13 is a longitudinal mid-section of a modified stay bolt, of which Fig. 14 is a plan.

Referring to the drawings, let A designate the metal rim of the wheel, B the felly which is of wood, C the tire shoe, D the inner tube, and E the clamp as a whole comprising the head F, screw stem G, and clamping nut H. The rim A and shoe C are of the usual construction of clencher tires, the shoe having lateral flanges I which are held by the clamp in engagement with the overhanging flanges of the rim, in the well known manner.

Our improved clamp differs from the ordinary clamp or stay bolt only in the shape and proportions of the head. Its screw stem and clamping nut may be constructed in any known way according to the purpose for which it is to be used. The head F is struck up from stiff metal plate so as to form a middle zone $a$ and side wings $b$ $b$. The zone $a$ instead of being flat as heretofore is curved, preferably in the segment of a cylinder. As shown in Fig. 2 this curve may be formed of an arc $c$ of which the radii $d$ converge toward the center or rotative axis of the wheel. Or this shape may be modified as hereinafter described. The wings $b$ are as heretofore inclined, receding from each other toward their outer edges. The head thus forms a sort of curved trough. The wings $b$ may be slightly concave on their outer sides $e$ and correspondingly convex on their inner sides $f$. The ideal curve is a segment of a very obtuse cone the axis of which coincides with the axis of rotation of the wheel. Practically, however, it is preferable to make the middle zone $a$ of a greater concavity than that of the arc $c$, in order that toward its opposite ends the head may approach more closely to the rim, and its wings consequently exert a slightly greater pressure against the flanged margins of the shoe than at their middle portion. Or in other words it is preferable to make the radii $d$ $d$ somewhat shorter than would reach to the center of the wheel. Thus the head F is given a hold upon the inclined inner faces of the shoe which is no less intimate at the ends of the head than at its middle, and preferably is slightly more intimate at the ends in order to allow for the spring of the metal and the yield of the rubber fabric of the shoe.

The difference between our improved clamp head and those heretofore made will be apparent from a comparison of Figs. 11 and 12, the former showing such a trough as would be formed by the prolongation or extension of our improved head, while Fig. 12 shows the straight trough which would be formed by a similar prolongation of the head heretofore used. It will be observed that the trough shown in Fig. 11 follows substantially the contour of the rim and shoe, whereas that shown in Fig. 12, being straight, occupies a tangential position which would soon carry its prolongation outside the dimension of the shoe. It follows that with the construction shown in Fig. 12 the head can have close contact with the shoe only in its medial plane denoted by the line $x$ $x$, whereas with our improved construction the contact is at least equally close in advance of and behind this plane, and may even be slightly more intimate at the front and rear ends of the head than at its medial portion.

For certain apparatus it is desirable to lift the middle portion of the head away from the rim, as for example in order to give room for a fastening nut to be introduced between. One example of this is where the stay bolt is combined with the air valve as shown in Figs. 8, 9 and 10. Here it is desirable that the middle of the stay bolt head be separated from the rim at least sufficient to make room for the usual clamping nut J. The middle portion $g$ of the zone $a$ is made flat in order that it may be embraced between the nut J and the usual washer K between which and the end flange L the inner tube D is clamped. The end portions $h$ $h$ of the zone $a$ might be flat or otherwise shaped, being shown in Fig. 8 as substantially flat and at an angle to the middle portion $e$. It results from this that when the head is viewed in plan as shown in Fig. 10, the zone $a$ is wider at its middle $g$ and diminishes in width in its inclined portions $h$, its ends being narrower than its middle because they approach closer to the central axis of the wheel, and hence enter farther between the converging faces of the flanged margins I I of the shoe. These narrowed ends however are so wide as to afford a no less intimate engagement with the shoe than the middle portion, and preferably engage it more intimately, being, relatively to the converging sides of the shoe, of greater width than the middle portion.

Another modification is shown in Figs. 13 and 14, which show a very short stay bolt adapted for a "demountable rim" where the stay bolt passes through the rim only and not through the felly. The head in this construction is formed with its zone $a$ curved in an arc of considerably shorter radius than the wheel to which it is applied, so that its middle portion is lifted considerably away from the rim as shown in Fig. 13. This results in the zone $a$ being widest at its middle and narrowing thence toward its ends as shown in Fig. 14.

In each of the constructions shown the head should be of such width relatively to the space between the shoe flanges that when the clamp is finally tightened no portion of the head shall touch the rim.

In the case of a long head, it is important that the wings $b$ $b$ shall have their outer sides concaved, conforming to the ideal trough shown in Fig. 11; but for a very short head this concaving would be imperceptible, and it is hence admissible that such concaving be omitted.

We claim as our invention:—

1. A tire clamp having its head formed of rigid material with exteriorly concaved sides adapted to engage the tire, the ends of the head approaching the rim more closely than the lower parts of the sides at the middle of the head.

2. A tire clamp having its head formed of rigid material with exteriorly concaved sides adapted to engage the tire, the ends of the head approaching the rim more closely than the lower parts of the sides at the middle of the head, and the under side of the head being curved from the middle thereof toward its ends.

3. A tire clamp having its head formed of rigid material with exteriorly concaved sides adapted to engage the tire, the ends of the head approaching the rim more closely than the lower parts of the sides at the middle of the head, and said head being shaped relatively to the curve of the tire and the inner surfaces of its shoe to engage the shoe no less intimately at its ends than at its middle.

4. A tire clamp having its head formed of rigid material with a middle zone and two inclined wings, said wings being slightly concave on their outer faces.

5. A tire clamp having its head formed with a middle zone and two inclined wings, said zone elevated from the rim at its middle, and made correspondingly wider at its middle, narrowing thence toward its ends, and shaped to engage the shoe no less intimately at its ends than at its middle.

In witness whereof, we have hereunto signed our names in the presence of two subscribing witnesses.

MAXIMILIAN CHARLES SCHWEINERT.
HENRY P. KRAFT.

Witnesses:
EUGENE V. MYERS,
FRED WHITE.